(12) United States Patent
Turner et al.

(10) Patent No.: US 7,034,415 B2
(45) Date of Patent: Apr. 25, 2006

(54) PIVOTING MIRROR WITH IMPROVED MAGNETIC DRIVE

(75) Inventors: Arthur Monroe Turner, Allen, TX (US); Andrew Steven Dewa, Plano, TX (US); John W. Orcutt, Richardson, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 26 days.

(21) Appl. No.: 10/681,986

(22) Filed: Oct. 9, 2003

(65) Prior Publication Data
US 2005/0078346 A1    Apr. 14, 2005

(51) Int. Cl.
*G02B 26/08*    (2006.01)

(52) U.S. Cl. .................... 310/36; 335/229; 359/223; 359/224; 385/18

(58) Field of Classification Search ............... 335/229, 335/230, 231, 234; 359/223, 224; 385/18; 398/45; 310/36–39
See application file for complete search history.

(56) References Cited

U.S. PATENT DOCUMENTS 6,295,154 B1    9/2001    Laor et al. ............... 359/223
6,538,799 B1 *  3/2003    McClelland et al. ........ 359/291

* cited by examiner

*Primary Examiner*—Darren Schuberg
*Assistant Examiner*—Judson H. Jones
(74) *Attorney, Agent, or Firm*—William B. Kempler; W. James Brady, III; Frederick J. Telecky, Jr.

(57) ABSTRACT

A magnetic drive for providing pivotal motion to a functional surface, such as a mirror. The magnetic drive may be used to drive any torsional hinged device, but is particularly suitable for driving a torsional hinged mirror. According to a first embodiment, a dual axis functional surface uses a first pair of torsional hinges to provide primary movement to the functional surface and a second pair of torsional hinges provides movement orthogonal to the primary movement to allow positioning in two directions. The mass and movement of inertia of the functional surface is reduced by relocating permanent magnet sets to the axis of rotation. The reduced mass and movement of inertia results in a stiff robust hinge having a resonant frequency above about 120 Hz.

28 Claims, 5 Drawing Sheets

PIVOTING MIRROR WITH IMPROVED MAGNETIC DRIVE

CROSS-REFERENCE TO RELATED APPLICATIONS

This application relates to and commonly assigned patent application Ser. No. 10/682,583, entitled "Scanning Device with Improved Magnetic Drive," filed concurrently herewith, which application is hereby incorporated herein by reference.

TECHNICAL FIELD

The present invention relates generally to pivoting devices and more specifically to magnetically driven MEMS (micro-electric mechanical systems) torsional hinge pivoting functional surfaces such as mirrors. The invention may be applicable to all types of functional surfaces and mirrors, but is particularly suitable for use as an optical switching mirror for an optical communication system. According to this application, a first set of torsional hinges provides rotation of the functional surface about a first axis. A second pair of torsional hinges may be provided for movement about a second axis to control movement in a direction that is substantially orthogonal to the rotation of the functional surface about the first axis.

BACKGROUND

Texas Instruments presently manufactures torsional dual axis and single axis mirror MEMS devices fabricated out of a single piece of material (such as silicon, for example) typically having a thickness of about 100–115 microns. Although manufacturing has been substantially limited to mirrors, it will be appreciated that the use of such torsional hinges may be equally applicable to other functional surface such as light grates or even devices not related to light or light beams. The dual axis layout consists of a functional surface or mirror normally to light or light beams. The dual axis layout consists of a functional surface or mirror normally supported on a gimbal frame by two silicon torsional hinges, whereas for a single axis device the surface mirror is supported directly by a pair of torsional hinges. The gimbal frame used by the dual axis device is attached to a support frame by another set of torsional hinges. One example of a dual axis torsional hinged mirror is disclosed in U.S. Pat. No. 6,295,154 entitled "Optical Switching Apparatus" and was assigned to the same assignee on the present invention.

According to the prior art, torsional hinge devices were initially driven directly by magnetic coils interacting with small magnets mounted on the pivoting surface at a location orthogonal to and away from the pivoting axis to oscillate the device or, in the case of a mirror, create the sweeping movement of the beam. In a similar manner, orthogonal movement of the device was also controlled by magnetic coils interacting with magnets mounted on the gimbals frame at a location orthogonal to the axis used to pivot the gimbals frame.

According to the earlier prior art, the magnetic coils controlling the functional surface portion (such as a mirror) typically received a positive or negative signal to position and hold the device at a precise rotational angle. Little or no consideration was given to the resonant pivoting frequency of the device, and in the application to mirrors, most of the earlier optical switching mirrors had a resonant frequency of around 100 Hz. Consequently, not only was the pivoting speed of the device rather slow, but also significant energy could be required to pivot the functional surface. Furthermore, the magnets mounted on the functional surface portion added mass and limited the pivoting speed.

Therefore, a dependable and inexpensive drive mechanism to rapidly position and maintain a torsional device at a precise angular rotation would be advantageous.

SUMMARY OF THE INVENTION

The problems mentioned above are addressed by the present invention, which according to one embodiment provides a magnetic drive apparatus suitable for use as the means of pivoting a functional surface, such as a mirror, to position and maintain the functional surface of the device at a precise position. When the functional surface is a reflective surface or mirror, it is positioned to intercept a beam of light from a light source. A support structure supports the functional surface of the device along a first pair of torsional hinges, for pivoting around a first axis in a primary direction.

According to a single axis embodiment, the support structure comprises a support member mounted to the support structure and connected directly to the functional surface by the first pair of torsional hinges. Alternately, according to a dual axis embodiment, the support member is still mounted to the support structure, but also includes a second pair of torsional hinges extending between the support member and a gimbals portion arranged to allow the gimbals portion to pivot about a second axis substantially orthogonal to the first axis. The functional surface portion is attached to the gimbals portion by the first pair of torsional hinges. Thus, when the functional surface is a reflective surface or mirror, pivoting of the device along the first axis and about the first pair of torsional hinges results in a beam of light reflected from the reflective surface being moved to a location in a primary direction, and pivoting of the device about the second pair of torsional hinges results in the reflected light moving substantially orthogonal to the movement of the light in the primary direction. In both the single axis and dual axis embodiments of this invention, at least one magnet is mounted along the first axis of the functional surface and, if two magnets are used, one each of the magnets is located adjacent one of the hinges of the first pair of torsional hinges. If a single magnet is used, it is mounted at the center of the functional surface. One technique for magnetically driving the pivoting motion of the mirror or other type of functional surface is to attach a magnet selected to have a diametral charge perpendicular to the axis of rotation and substantially parallel to the functional surface of the device. A first magnetic driver cooperates with the magnet(s) to cause pivotal movement about the first pair of torsional hinges. Another technique provides for attaching the magnets to the mirror such that the "N"-"S" pole orientation is perpendicular to the functional surface of the mirror such that a pair of electromagnetic arms that switch polarity cooperate with one of the "N" or "S" poles of the magnet to cause the pivotal motion.

However, according to the dual axis embodiment, there is also included at least one second magnet and preferably two second magnets mounted along the second axis such that one each of the second magnets is located adjacent one hinge of the second pair of torsional hinges. A second magnetic driver cooperates with the second magnet according to either of the two techniques discussed above to pivot the device about the second pair of torsional hinges so as to provide an orthogonal movement.

BRIEF DESCRIPTION OF THE DRAWINGS

Other objects and advantages of the invention will become apparent upon reading the following detailed description and upon referencing the accompanying drawings in which.

DETAILED DESCRIPTION OF ILLUSTRATIVE EMBODIMENTS

Like reference numbers in the figures are used herein to designate like elements throughout the various views of the present invention. The figures are not intended to be drawn to scale and in some instances, for illustrative purposes, the drawings may intentionally not be to scale. One of ordinary skill in the art will appreciate the many possible applications and variations of the present invention based on the following examples of possible embodiments of the present invention. The present invention relates to a pivoting apparatus, such as a mirror device, with a moveable functional surface that is suitable for positioning and maintaining the functional surface at precise locations. In embodiments of this invention where the functional surface is a mirror, a beam of light may be reflected from the mirror or functional surface and positioned and maintained at a precise location. More specifically, the invention relates to a structure and magnetic drive for pivoting the functional surface, such as a mirror structure, about a first or primary axis along a pair of torsional hinges. Although the functional surface could be used with any type of apparatus where precise angular orientation or positioning would be advantageous, the invention is primarily discussed herein with respect to the control of a light beam such as by a light grate or preferably by a reflective surface or mirror. However, unless limited by the claims, the invention is intended to cover other types of torsionally hinged functional surfaces.

Figure 1:
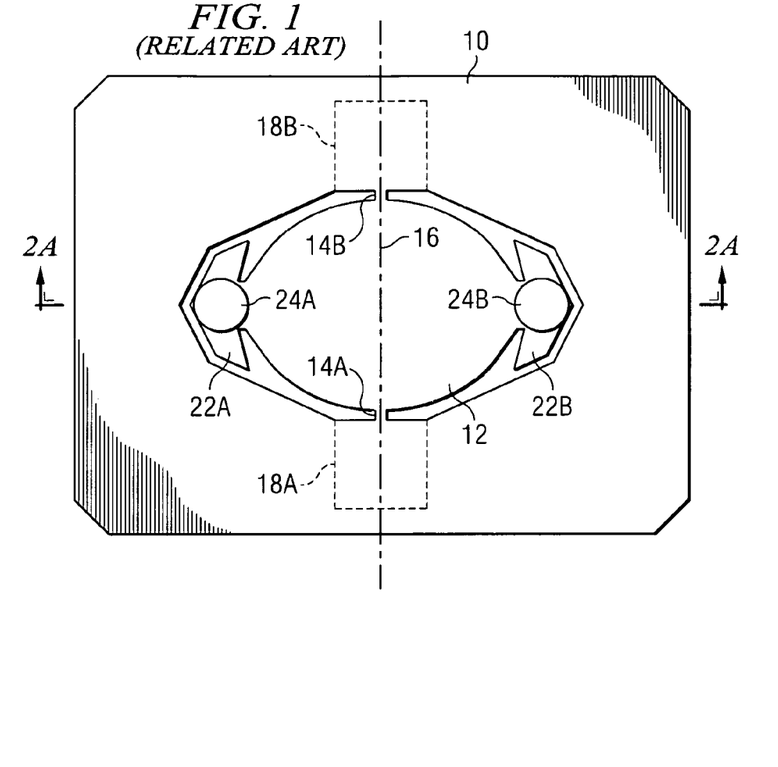
FIG. 1 is an embodiment of a single axis torsional device wherein the functional surface is a mirror.

FIG. 1 illustrates a single axis torsional device wherein the functional surface is a mirror. The device of FIG. 1 includes a support member 10 supporting the functional surface, such as mirror or reflective surface 12. The functional surface or mirror is supported by a single pair of torsional hinges 14A and 14B. Thus, it will be appreciated that the functional surface portion 12 can be pivoted or moved around axis 16 by a drive source to one or more precise locations and more particularly a mirror functional surface can move a light beam to a selected location. The mechanical motion of the functional surface along the primary axis may be determined by the customers' needs, but, when used as a switching mirror, this motion will typically be greater than about 1 degree and may be as great as about 10 degrees. It will also be appreciated that an alternate embodiment of a single axis functional surface, such as a mirror, may not require the support member or frame 10 as shown in FIG. 1. For example, as shown in FIG. 1, the torsional hinges 14A and 14B may simply extend to a pair of hinge anchors 18A and 18B as shown in dotted lines. The functional surface or mirror portion 12 is on the order of 50–400 microns in thickness and may be suitably polished on its upper surface to provide a specular or mirror surface.

Further, because of the advantageous material properties of single crystalline silicon, MEMS based devices have a very sharp torsional resonance. The Q of the torsional resonance typically is in the range of 100 to over 1000. This sharp resonance results in a large mechanical amplification of the functional surface motion at a resonance frequency versus a non-resonant frequency. Therefore, according to one embodiment, by designing an optical switching mirror to have a resonant frequency, rapid analog movement and positioning of the mirror can be achieved with minimal power.

There are many possible drive mechanisms available to move the device along the primary axis. Further, by carefully controlling the dimension of hinges 14A and 14B (i.e., width, length and thickness) the functional surface may be manufactured to have a selected natural resonant frequency. For example, if the functional surface is a switching mirror, the resonant frequency may be selected to be above about 120 Hz, and preferably between about 250 Hz and 1000 Hz. Thus, as an example only, by providing a switching mirror with a higher resonant frequency, the power and speed to drive the mirror to a selected location may be reduced.

Figure 2A:
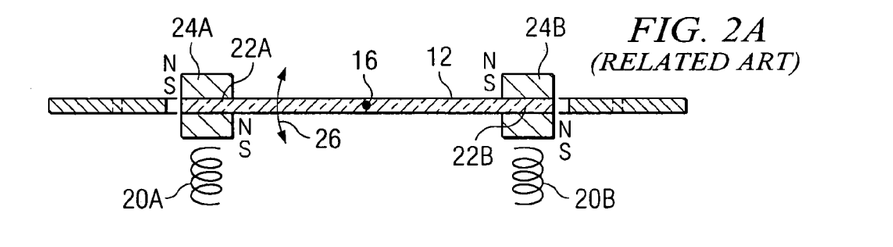
FIGS. 2A–2B are cross-sectional views of FIG. 2 illustrating one method of providing magnetic rotation or pivoting about the torsional hinge.
Figure 2B:
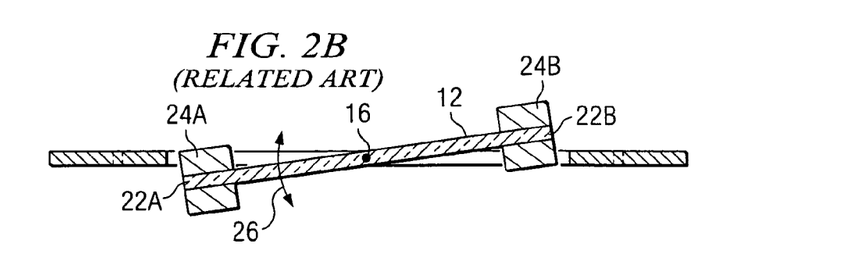

Referring to FIGS. 2A and 2B along with the mirror assembly of FIG. 1, the assembly may include a pair of serially connected electrical coils 20A and 20B under tabs 22A and 22B respectively to provide the magnetic drive to move the functional surface. Thus, by energizing the coils with a positive or negative voltage, the functional surface portion 12 can be positioned and maintained at a precise location. To facilitate the magnetic drive, the device assembly also includes a pair of permanent magnets 24A and 24B mounted on tabs 22A and 22B of the functional surface portion 12 orthogonal to the axis 16. Permanent magnet sets 24A and 24B symmetrically distribute mass about the axis of rotation 16 to minimize oscillation under shock and vibration. Each permanent magnet 24A, 24B preferably comprises an upper magnet set mounted on the top surface of the mirror portion 12 using conventional attachment techniques such as adhesive or indium bonding and an aligned lower magnet similarly attached to the lower surface of the mirror portion 12 as shown in FIGS. 2A and 2B. There are several possible arrangements of the four sets of magnets which may be used. For example, in FIG. 2A the magnets of each set are arranged serially and have an axial charge such as the north/south pole arrangement illustrated in FIG. 2A.

The middle or neutral position of functional surface portion 12 of FIG. 1 is shown in FIG. 2A, which is a section taken through the assembly along line 2A—2A of FIG. 1. Thus, if the functional surface is a mirror, rotation of the functional surface portion or mirror 12 about axis 16 is shown in FIG. 2B as indicated by arrow 26.

Figure 3:
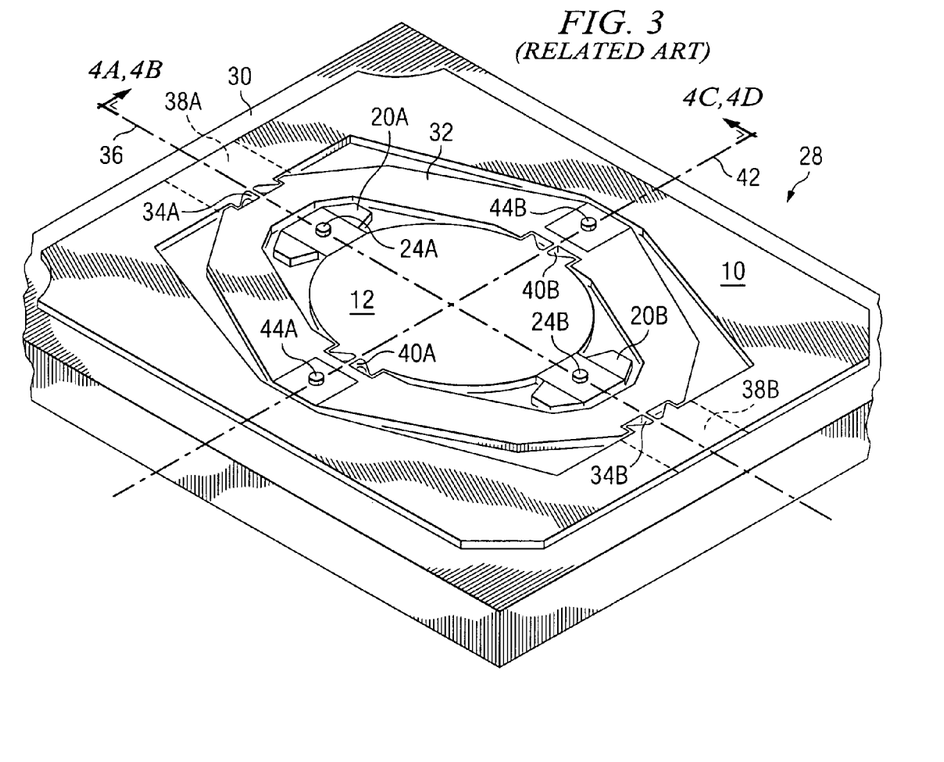
FIG. 3 is a perspective view of a prior art two-axis torsional functional surface, wherein the functional surface is a mirror for generating a beam sweep that may also be moved orthogonal to the beam sweep.

Referring now to FIG. 3, there is shown a perspective view of a two-axis bi-directional device assembly 28 which may be used to not only provide movement of the functional surface in a first direction, but the functional surface may also be adjusted in a direction orthogonal to the first direction. As shown, the moveable assembly 28 is illustrated as being mounted on a support 30, and as being driven along both axes by electromagnetic forces. As was discussed above with respect to single axis pivoting devices and especially where the functional surface is a mirror, the moveable assembly 28 may be formed from a substantially planar material and the functional or moving parts may be etched in the planar sheet of material (such as silicon) by techniques similar to those used in semiconductor art. As shown, the functional components include a support member or frame portion 10, similar to the single axis device. However, unlike the single axis device, the support structure of the dual axis device also includes an intermediate gimbals portion 32 along with the functional surface, such as mirror portion 12. It will be appreciated that the intermediate gimbals portion 32 is hinged to the support member or frame portion 10 at two ends by a pair of torsional hinges 34A and 34B spaced apart and aligned along an axis 36. Except for the pair of hinges 34A and 34B, the intermediate gimbals portion 32 is separated from the frame portion 10. It should also be appreciated that, although support member or frame portion 10 provides an excellent support for mounting the device to support structure 30, it may be desirable to eliminate the frame portion 10 and simply extend the torsional hinges 34A and 34B to anchors 38A and 38B which connect the hinges directly to the support 30 as indicated by dotted lines on FIG. 3.

The inner, centrally disposed functional surface portion 12 is attached to gimbals portion 32 at hinges 40A and 40B along an axis 42 that is orthogonal to or rotated 90° from axis 36. As was discussed with respect to the single axis device of FIG. 2, where the functional surface is a reflective surface or mirror portion 12, the device will have a thickness on the order of 50–400 microns and is suitably polished on its upper surface to provide a specular or mirror surface. If desired, a coating of suitable material can be placed on the mirror portion to enhance its reflectivity for specific radiation wavelengths.

As has also been discussed with respect to single axis devices, there are many combinations of drive mechanisms to pivot or move the functional surface. However, to provide orthogonal movement about axis 36, a smaller angular motion is usually sufficient. Therefore, a magnetic drive similar to that discussed with respect to the mirror of FIG. 1 may be used to produce a controlled orthogonal movement of gimbals portion 32 about the torsional hinges 34A and 34B to move the beam sweep to a precise position. Consequently, as shown in FIG. 3, a set of permanent magnet sets 44A and 44B also are associated with the orthogonal movement.

Figure 4A:
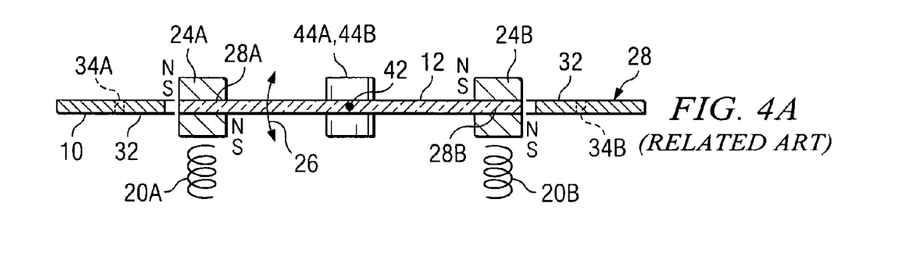
FIGS. 4A–4D are cross-sectional views of the device of FIG. 3 illustrating one method of providing magnetic rotation or pivoting about the two sets of torsional hinges.
Figure 4B:
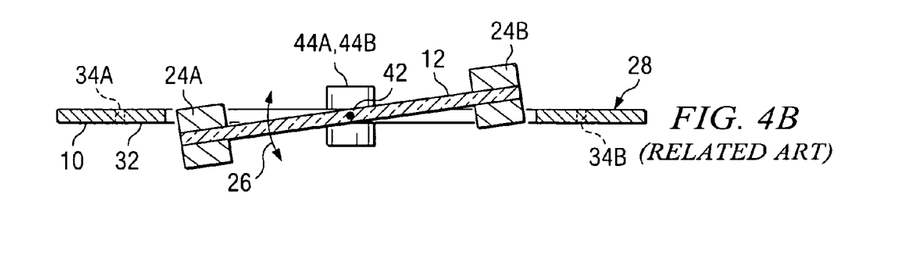

Referring to FIGS. 4A and 4B along with FIG. 3, assembly 28 may typically include a pair of serially connected electrical coils 20A and 20B under tabs 22A and 22B respectively to provide a magnetic drive to pivot or position the functional surface as discussed above with respect to the single axis device of FIGS. 2A and 2B. Thus, by energizing the coils with a precise positive or negative voltage, the functional surface portion 12 can be made to pivot about torsional hinges 40A and 40B to a selected location. Also as mentioned above, to facilitate the magnetic drive, assembly 28 also typically includes a first pair of permanent magnets 24A and 24B mounted on tabs 22A and 22B of the functional surface portion 12. Permanent magnet sets 24A and 24B symmetrically distribute mass about the axis of rotation 42 to thereby minimize oscillation under shock and vibration. Further, each permanent magnet 24A, 24B preferably comprises an upper magnet set mounted on the top surface of the functional surface of the assembly 28 using conventional attachment techniques such as adhesive or indium bonding and an aligned lower magnet similarly attached to the lower surface of the assembly 28 as shown in FIGS. 4A and 4B. The magnets of each set of this embodiment are axial charged and are typically arranged serially such as the north/south pole arrangement indicated in FIG. 4A.

Figure 4C:
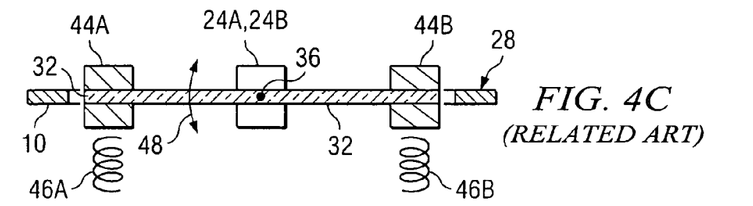
Figure 4D:
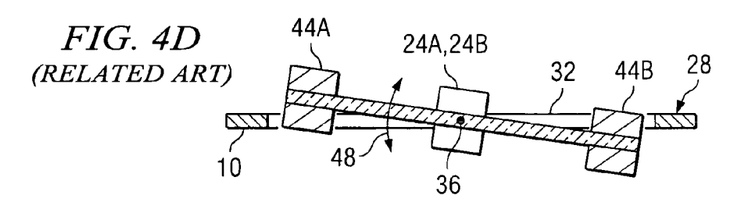

Referring now to FIGS. 4C and 4D along with FIG. 3, gimbals portion 32 is mounted to frame portion 10 by means of hinges 34A and 34B. Motion of the gimbals portion 32 about axis 36 as illustrated in FIG. 3 is provided by another pair of serially connected coils 46A and 46B as shown by double headed arrow 48. As has been mentioned, pivoting about axis 36 will provide discrete vertical motion and is facilitated by permanent magnet sets 44A and 44B.

The middle or neutral position of mirror assembly 28 of FIG. 3 is shown in FIG. 4A, which is a section taken through the assembly along line 3A—3A (or axis 36) of FIG. 3. Rotation of the functional surface portion 12 about axis 42 independent of gimbals portion 32 and/or frame portion 10 is shown in FIG. 4B as indicated by arrow 26. FIG. 4C shows the middle position of the functional surface assembly 28, similar to that shown in FIG. 4A, but taken along line 3B—3B (or axis 42) of FIG. 3. Rotation of the gimbals portion 32 (which supports functional surface portion 12) about axis 36 independent of frame portion 10 is shown in FIG. 4D as indicated by arrow 48. The above arrangement allows independent rotation of the functional surface portion 12 about the two axes, and when the application of the invention is a mirror, will provide the ability to direct a beam of light to a precise location in two directions.

Further, as discussed above, by carefully controlling the dimension of primary hinges 40A and 40B (i.e., width, length and thickness) the dual axis device may also be manufactured to have a natural resonant frequency, which is greater than about 100 Hz. Further, it is also possible to design the hinges 34A and 34B through gimbals axis 36 to also have a resonant frequency higher than 100 Hz. Thus, by providing a dual axis mirror with a resonant frequency for both sets of torsional hinges, stiff robust hinges may be provided while at the same time the power loading may be reduced and the actuation speed increased.

From the above discussion, it will be appreciated that it is advantageous to manufacture a pivoting mirror or other type of functional surface having a selected resonant frequency. As was also discussed, a magnetic drive is an inexpensive, dependable and effective technique for positioning and holding a torsional hinged device, such as a mirror, at a precise location. Unfortunately, the magnet sets mounted at the tips of the rotating surfaces add to the mass and moment of inertia of the resonant functional surface, which in turn tends to result in the surface having a low resonant frequency and pivotal speed. For example, the resonant frequency of a dual axis magnetic driver device of the type shown in FIG. 3 is about 100 Hz and would be even lower if the size of the functional surface was increased. A resonant frequency of 100 Hz simply is no longer satisfactory for many if not most optical switching mirrors. Such a slow resonant frequency means that analog pivoting and positioning is simply too slow for high-speed optical switching. Therefore a structure having a functional surface with a magnetic drive and a resonant frequency of above about 120 Hz, about one, and preferably both, axes would be advantageous, and particularly suitable for use as a mirror.

Figure 5A:
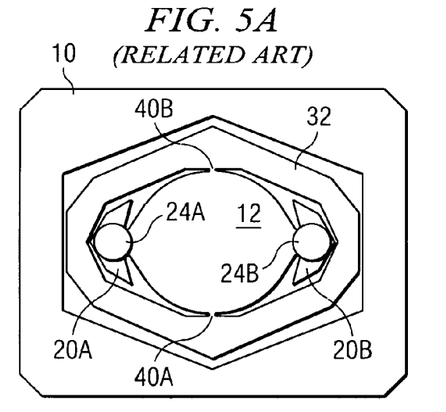
FIGS. 5A and 5B illustrate a prior art magnetic coil drive arrangement used to move the functional surface of the device.
Figure 5B:
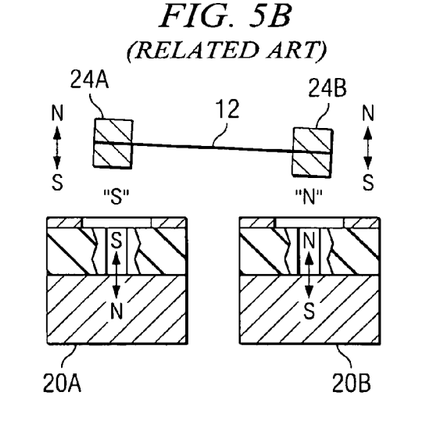

Referring now to the prior art FIGS. 5A and 5B, along with FIG. 3, there is a further illustration how the coils 20A and 20B interact with the axial charged permanent magnetic sets 24A and 24B to cause movement of the mirror or reflective surface 12 about torsional hinges 40A and 40B. In the illustration of FIGS. 5A and 5B, coil 20B receives a voltage having a first polarity that creates a magnetic field having its "N"orth pole at the top of the coil or closest to permanent magnet set 24B whereas the coil 20A is serially connected to coil 20B so that the same voltage polarity creates a magnetic field with the "S"outh pole closest to permanent magnet 24A. Thus, coil 20B attracts magnet set 24B at the same time coil 20A repels magnet set 24A. These forces cause a clockwise rotation of the functional surface 12 in the illustration of FIG. 5B. However, if the voltage polarity across coils 20A and 20B is reversed, then coil 20A will attract magnet set 24A and coil 20B will repel magnet set 24B so as to cause the functional surface to pivot or rotate in the appropriate direction. Therefore, it is seen that by changing the voltage across coils 20A and 20B, the functional surface may be positioned and held at a precise location. However, as discussed, the added mass of the magnet sets to the functional surface in the manner shown may result in an unacceptable low resonant frequency, which may in turn result in a slow pivotal rotation that is unacceptable for many applications.

Figure 6A:
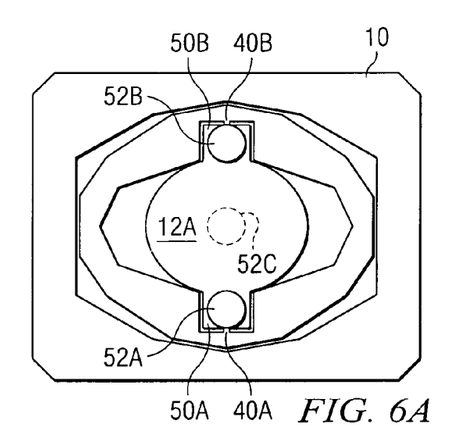
FIGS. 6A and 6B illustrate a magnetic drive technique for providing pivoting about a primary axis according to one embodiment of the invention.
Figure 6B:
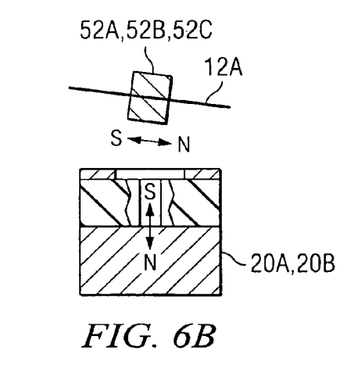

Therefore, referring now to FIGS. 6A and 6B, there is illustrated a structure and permanent magnet arrangement that significantly reduces the moment of inertia of the mirror or other functional surface 12 of the device, which in turn increases the resonant frequency and pivotal speed of the functional surface. As shown, the tabs 22A and 22B of FIG. 3 used to mount the permanent magnet sets have been eliminated and, according to one embodiment, replaced by enlarged mounting areas 50A and 50B on the functional surface 12A and adjacent to the torsional hinges 40A and 40B respectively.

Magnet sets 52A and 52B are mounted on enlarged areas 50A and 50B respectively in the same manner as magnet sets 24A and 24B were mounted to tabs 22A and 22B. It is important to note, however, that, as shown in corresponding FIG. 6B, magnet sets 52A and 52B have a diametral charges perpendicular to the axis or rotation rather than the axial charge of magnet sets 24A and 24B. It is, of course, also necessary to relocate the drive coils 20A and 20B so that they are below magnet sets 52A and 52B respectively. Alternatively, a single magnet set indicated by dotted lines 52C located in the center of mirror portion 46 and a single drive coil located below magnet set 52C could be used as shown in FIG. 6B.

Figure 7A:
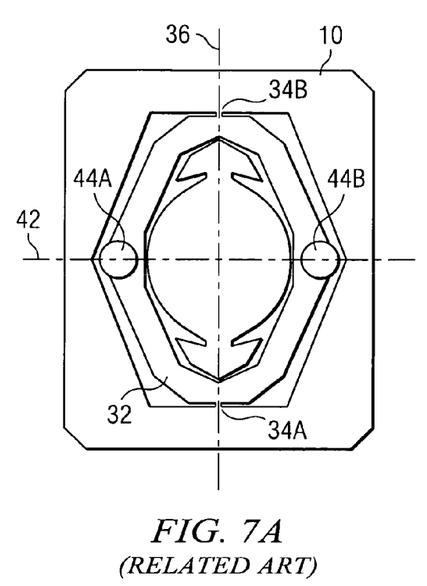
FIGS. 7A and 7B illustrate a prior art magnetic coil drive arrangement to provide orthogonal movement to the device.
Figure 7B:
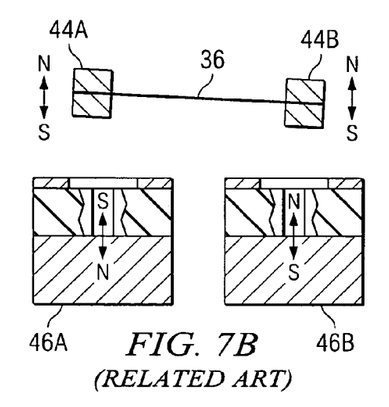
Figure 8A:
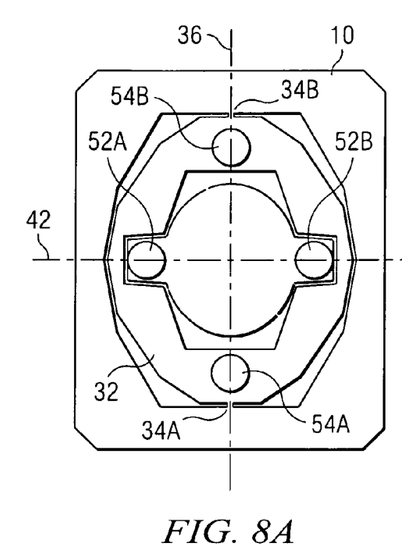
FIGS. 8A and 8B illustrate a magnetic drive arrangement for providing orthogonal movement according to another embodiment of the invention.
Figure 8B:
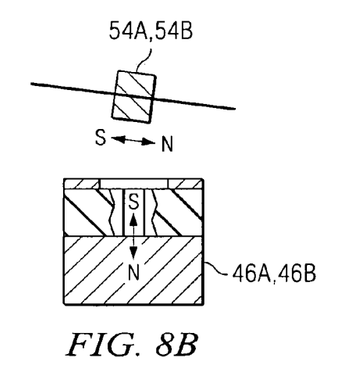

The same approach may also be used to further decrease the mass and moment of inertia of the device by also relocating magnet sets 44A and 44B used to provide controlled orthogonal movement of the functional surface structure as shown in FIGS. 7A and 7B. For example, the magnet sets 54A and 54B are relocated from the position on axis 42 so that they are mounted on axis 36 of the gimbals structure 32 as shown in FIG. 8A. The coils 46A and 46B are also relocated to be under magnet sets 54A and 54B. In addition to the significant reduction in the moment of inertia realized by moving the magnet sets onto the axis, it has also been found that the size of the magnet sets 52A and 52B and the magnet sets 54A and 54B can be significantly reduced to further reduce the mass and moment of inertia of the device. The resulting reduction in mass and moment of inertia of the device allows a significant increase in the resonant frequency for both sets of axes. This increase in resonant frequency allows for stiff robust torsional hinges with increased pivoting speed at both axes, and is particularly useful for dual axis optical switches used in communication systems when the functional surface is a mirror.

Figure 9A:
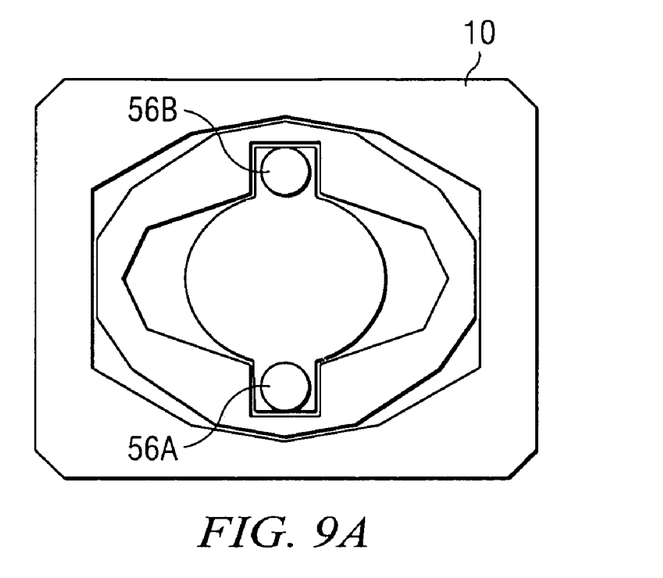
FIGS. 9A and 9B illustrate an alternate magnetic drive techniques according to the present invention suitable for use with the embodiments discussed with respect to FIGS. 6A and 6B and 8A and 8B.
Figure 9B:
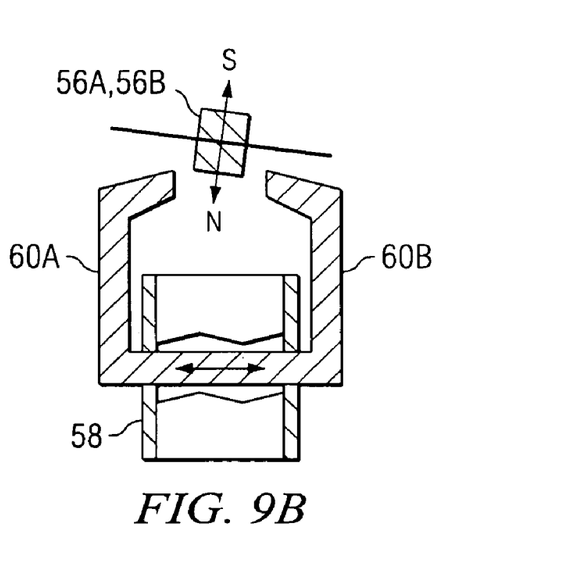

FIGS. 9A and 9B show a second magnetic drive arrangement that may be used to position and hold the functional surface in a precise location for both the primary motion and the orthogonal motion. Although the drive arrangement is illustrated as a drive using two magnets and two electromagnetic coils to generate motion, it will be appreciated that the arrangement could also be used with a single magnet set to generate the primary motion. As shown, axial charged magnet sets 56A and 56B similar to those shown in FIG. 3, is used instead of diametral charged magnet sets 52A–52B, and 54A–54B. Further, coils shown in FIGS. 5B, 6B, 7B and 8B are replaced by an electro magnet device, such as device 58, having iron or permeable legs 60A and 60B, that extend to each side of the magnet sets 56A and 56B.

It will also be appreciated that the weight and mass of a single axis device of the type shown in FIG. 1, can also be decreased in a manner similar to that discussed above with respect to the dual axis mirror of FIG. 3. For example, the magnet sets 24A and 24B of FIG. 1 can be relocated from tabs 22A and 22B to enlarged areas at the pivot axis 16 as was discussed with the dual axis embodiment. Similarly, diametral charged magnets can be used with the offset coil structure discussed with respect to FIGS. 6A and 6B or axial charged magnets can be used with the electromagnet arrangement of FIG. 9B with the iron or permeable core to position and hold the mirror at a selected location.

The foregoing descriptions of specific embodiments of the present invention have been presented for purposes of illustration and description. They are not intended to be exhaustive or to limit the invention to the precise forms disclosed as many modifications and variations are possible in light of the above teaching. The embodiments were chosen and described in order to best explain the principles of the invention and its practical application to thereby enable others skilled in the art to best utilize the invention and various embodiments with various modifications as are suited to the particular use contemplated. It is intended that the scope of the invention be defined by the claims appended hereto and their equivalents.

What is claimed is:
1. A pivoting device comprising:
a functional surface portion;
a gimbals portion pivotally supporting said functional surface along a first axis by a first pair of torsional hinges;
a support member pivotally supporting said gimbals portion by a second pair of torsional hinges along an axis substantially orthogonal to said first axis, said first and second pairs of torsional hinges operating such that said pivoting of said functional surface portion about said first pair of torsional hinges results in movement in a primary direction, and pivoting of said device about said second pair of torsional hinges results in movement substantially orthogonal to said primary direction;
at least one first magnet located along said first axis;

a first magnetic driver cooperating with said at least one first magnet for causing pivotal movement about said first pair of torsional hinges;

a second magnet mounted along said second axis and located adjacent one hinge of said second pair of torsional hinges; and a second magnetic driver cooperating with said second magnet for pivoting said device about said second pair of torsional hinges to provide said orthogonal movement;

wherein said at least one first magnet has a diametral charge perpendicular to the axis of rotation and substantially parallel to said functional surface and wherein said first magnetic driver is at least one coil located proximate said one first magnet.

2. The device of claim 1 wherein said at least one first magnet comprises two first magnets, one each located adjacent one each of said first pair of torsional hinges and said at least one coil comprises a pair of coils.

3. The device of claim 1 wherein said first and second magnetic drivers pivot said device to selected positions.

4. The device of claim 3 wherein at least one of said first and second pair of torsional hinges have a resonant frequency above about 120 Hz.

5. The device of claim 1 wherein at least one of said first and second pair of torsional hinges have a resonant frequency of between about 250 Hz and about 1000 Hz.

6. The device of claim 1 wherein said at least one first magnet has an axial charge and wherein said first magnetic driver is an electromagnet having legs extending to each side of its corresponding magnet.

7. The device of claim 6 wherein said at least one first magnet comprises two first magnets and said electromagnet is a pair of electromagnets.

8. The device of claim 1 wherein said functional surface is light grating positioned to intercept a beam of light.

9. The device of claim 1 wherein said functional surface is a reflective surface positioned to intercept a beam of light.

10. The device of claim 9 is used as an optical switch in a communication system.

11. The device of claim 9 wherein at least one of said first and second pair of torsional hinges have a resonant frequency of between about 250 Hz and about 1000 Hz.

12. The device of claim 11 is used as an optical switch in a communication system.

13. The device of claim 1 wherein said at least one first magnet is located at the center of said functional surface, and said first magnetic driver is located below said at least one first magnet.

14. A pivoting device comprising:
a functional surface portion;
support structure pivotally supporting said functional surface portion along a first axis by a pair of torsional hinges such that said pivoting of said functional surface portion about said pair of torsional hinges results in movement in a first direction;
a first magnet located along said first axis;
a first magnetic driver cooperating with said at least one first magnet for causing pivotal movement about said pair of torsional hinges;

wherein said first magnet has a diametral charge perpendicular to the axis of rotation and substantially parallel to said functional surface and wherein said first magnetic driver is at least one coil located proximate said first magnet.

15. The device of claim 14 wherein said first magnet comprises two first magnets, one each located adjacent one each of said first pair of torsional hinges.

16. The device of claim 15 wherein said first magnet has an axial charge and wherein said magnetic driver is an electromagnet having legs extending to each side of its corresponding magnet.

17. The device of claim 14 wherein said first magnetic drive pivots said device to a selected position.

18. The device of claim 14 wherein said functional surface is a reflective surface positioned to intercept a beam of light.

19. The device of claim 14 wherein said device has a resonant frequency of between about 250 Hz and about 1000 Hz.

20. The device of claim 19 wherein said functional surface is a reflective surface positioned to intercept a beam of light.

21. The device of claim 20 wherein said device is used as an optical switch in a communication system.

22. The device of claim 14 wherein said support structure comprises a gimbals portion connected to said functional surface along said first axis by said pair of torsional hinges and a support member pivotally supporting said gimbal portion by a second pair of torsional hinges along an axis substantially orthogonal to said first axis, such that said pivoting of said device about said second pair of torsional hinges results in movement substantially orthogonal to said first direction;
two second magnets mounted along said second axis and one each located adjacent each one of said second pair of torsional hinges; and
two second magnetic drivers cooperating with said two second magnets for pivoting said device about said second pair of torsional hinges to provide said orthogonal movement.

23. The device of claim 22 wherein said device has a resonant frequency above about 120 Hz around said first set of torsional hinges.

24. The device of claim 23 wherein said second magnetic driver pivots said device to a selected position.

25. The device of claim 24 wherein said second pair of torsional hinges has a resonant frequency above about 120 Hz.

26. The device of claim 22 wherein said functional surface is a reflective surface positioned to intercept a beam of light.

27. The device of claim 26 wherein said device is used as an optical switch.

28. The device of claim 14 wherein said first magnet is located at the center of said functional surface and said first magnetic driver is located below said first magnet.

* * * * *